United States Patent
Kawano et al.

(10) Patent No.: US 12,498,142 B2
(45) Date of Patent: Dec. 16, 2025

(54) HEAT-PUMP WATER HEATER

(71) Applicant: Mitsubishi Electric Corporation, Tokyo (JP)

(72) Inventors: Kosuke Kawano, Tokyo (JP); Kimitaka Kadowaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 209 days.

(21) Appl. No.: 18/548,620

(22) PCT Filed: Apr. 22, 2021

(86) PCT No.: PCT/JP2021/016246
§ 371 (c)(1),
(2) Date: Sep. 1, 2023

(87) PCT Pub. No.: WO2022/224392
PCT Pub. Date: Oct. 27, 2022

(65) Prior Publication Data
US 2024/0077231 A1 Mar. 7, 2024

(51) Int. Cl.
*F24H 4/04* (2006.01)
*F24H 15/227* (2022.01)
(Continued)

(52) U.S. Cl.
CPC ............... *F24H 4/04* (2013.01); *F25B 49/02* (2013.01); *F24H 15/227* (2022.01);
(Continued)

(58) Field of Classification Search
CPC ........ F24H 4/04; F24H 15/223; F24H 15/227; F24H 15/34; F24H 15/38; F24H 15/385;
(Continued)

(56) References Cited

U.S. PATENT DOCUMENTS 7,481,067 B2    1/2009  Nakayama et al.
2012/0291460 A1* 11/2012 Aoyagi ............... F25B 40/00
                                                    62/151

FOREIGN PATENT DOCUMENTS

JP    H05-034036 A    2/1993
JP    2001-201177 A   7/2001
(Continued)

OTHER PUBLICATIONS

Extended European Search Report dated Apr. 29, 2024 issued in corresponding European patent application No. 21937886.6.
(Continued)

*Primary Examiner* — Henry T Crenshaw
(74) *Attorney, Agent, or Firm* — Posz Law Group, PLC

(57) ABSTRACT

A heat-pump water heater includes a refrigerant circuit, a water circuit, and a controller. The refrigerant circuit includes a main circuit and a bypass circuit. The main circuit includes a compressor, a water heat exchanger, a first pressure-reducing device, an air heat exchanger, and an air-sending device. The bypass circuit includes a second pressure-reducing device. The water circuit includes a hot water tank, a water pump, and the water heater exchanger. In a night-time hot-water supply mode, the controller causes the water pump with a lowest frequency set in advance, causes the compressor with a lowest frequency set in advance, and stops the air-sending device.

7 Claims, 6 Drawing Sheets

(51) Int. Cl.
*F24H 15/385* (2022.01)
*F24H 15/429* (2022.01)
*F25B 49/02* (2006.01)

(52) U.S. Cl.
CPC .......... *F24H 15/385* (2022.01); *F24H 15/429* (2022.01); *F25B 2400/04* (2013.01); *F25B 2600/2501* (2013.01); *F25B 2700/1931* (2013.01); *F25B 2700/1933* (2013.01); *F25B 2700/21151* (2013.01); *F25B 2700/21152* (2013.01)

(58) Field of Classification Search
CPC .. F24H 15/429; F25B 49/02; F25B 2339/047; F25B 2400/04; F24D 19/1054
See application file for complete search history.

(56) References Cited

FOREIGN PATENT DOCUMENTS

| JP | 3738637 B2 | 1/2006 |
| JP | 2006-308261 A | 11/2006 |
| JP | 2013-019602 A | 1/2013 |
| JP | 2014-006010 A | 1/2014 |
| JP | 5 1812726 | * 11/2015 |
| JP | 5812726 B2 | 11/2015 |

OTHER PUBLICATIONS

International Search Report of the International Searching Authority mailed Jun. 22, 2021 for the corresponding International Application No. PCT/JP2021/016246 (and English translation).

* cited by examiner

HEAT-PUMP WATER HEATER

CROSS REFERENCE TO RELATED APPLICATION

This application is a U.S. national stage application of PCT/JP2021/016246 filed on Apr. 22, 2021, the contents of which are incorporated herein by reference.

TECHNICAL FIELD

The current disclosure relates to a heat-pump water heater that uses a heat pump in a water heater.

BACKGROUND ART

In the past, a heat-pump water heater has been known in which heat received from outside air by a heat pump using a refrigeration cycle is used to heat water stored in a hot water tank (see Patent Literature 1). In general, a user of such a heat-pump water heater causes the heat-pump water heater to operate during night-time at which electric power cost is low, the entire amount of the water in the hot water tank is heated, and the heated water is stored as hot or warm water in the hot water tank in order that the hot or warm water could be used in the day. In the heat-pump water heater, during night-time, the frequency of a compressor is reduced, whereby the heat-pump water heater operates with a high degree of efficiency at night-time. The heat-pump water heater can thus perform a highly efficient operation in which the entire amount of water in the hot water tank is slowly boiled up over time.

CITATION LIST

Patent Literature

Patent Literature 1: Japanese Unexamined Patent Application Publication No. 2006-308261

SUMMARY OF INVENTION

Technical Problem

However, in the heat-pump water heater, when water in the hot water tank is heated, a compressor and an air-sending device provided in a refrigerant circuit in which refrigerant flows are operated. The refrigerant is refrigerant that exchanges heat with the above water. In general, in a heat-pump water heater, noise that is caused by rotation of the air-sending device which is provided adjacent to an air heat exchanger is one of the main noises. The heat-pump water heater may be operated during night-time for the above reason. It is therefore desired that noise caused by the operation of the heat-pump water heater during night-time would be reduced.

The current disclosure is applied to solve the above problem, and relates to a heat-pump water heater in which noise caused by an operation of the heat-pump water heater during night-time is reduced.

Solution to Problem

A heat-pump water heater according to an embodiment of the present disclosure includes: a refrigerant circuit in which refrigerant circulates through refrigerant pipes; a water circuit in which water circulates through water pipes; and a controller configured to control components provided in the refrigerant circuit and components provided in the water circuit. The refrigerant circuit includes a main circuit and a bypass circuit. The main circuit is formed such that components in the main circuit are sequentially connected, and includes: a compressor configured to compress the refrigerant sucked, and discharge the compressed refrigerant; a water heat exchanger configured to cause heat exchange to be performed between the refrigerant which flows in the refrigerant circuit and the water which flows in the water circuit; a first pressure-reducing device configured to reduce a pressure of the refrigerant; and an air heat exchanger including heat exchange circuitry and an air-sending device, the heat exchange circuitry being configured to cause heat exchange to be performed between air and the refrigerant, the air-sending device being configured to send to the heat exchange circuitry, the air which is subjected to the heat exchange with the refrigerant. The bypass circuit forms a flow passage that connects the refrigerant pipe between the compressor and the water heat exchanger and the refrigerant pipe between the air heat exchanger and the compressor, the bypass circuit including a second pressure-reducing device configured to adjust a flow rate of the refrigerant which flows in the bypass circuit. The water circuit includes a hot water tank configured to store water supplied from the outside and heated water, a water pump configured to supply water that flows out from the hot water tank to the water heat exchanger and supply water that flows out from the water heat exchanger to the hot water tank, and the water heat exchanger. The controller is configured to perform controls in a night-time hot-water supply mode in which during night-time, the water is heated by the heat exchange between the water and the refrigerant in the water heat exchanger, and the heated water is stored in the hot water tank, one of the controls being performed to cause the water pump with a lowest frequency set in advance, another one of the controls being performed to cause the compressor with a lowest frequency set in advance, the other of the controls being performed to stop the air-sending device.

Advantageous Effects of Invention

As described above, according to the current disclosure, in the night-time hot-water supply mode, the controller of the heat-pump water heater causes the water pump to operate with the lowest frequency set in advance, causes the compressor to operate with the lowest frequency set in advance, and stops the air-sending device which promotes heat exchange between air and refrigerant at the air heat exchanger, whereby the air-sending device is not rotated. That is, in the heat-pump water heater, in the night-time hot-water supply mode, the controller stops the air-sending device. It is therefore possible to reduce noise that would be caused by the operation of the heat-pump water heater during night-time.

DESCRIPTION OF EMBODIMENTS

The embodiments of the current disclosure will be described with reference to the drawings. It should be noted that the following descriptions concerning the embodiments are not limiting. In addition, in each of figures which will be referred to below, relationships in size between components may be different from actual ones.

Embodiment 1

Configuration of Heat-pump Water Heater 100

Figure 1:
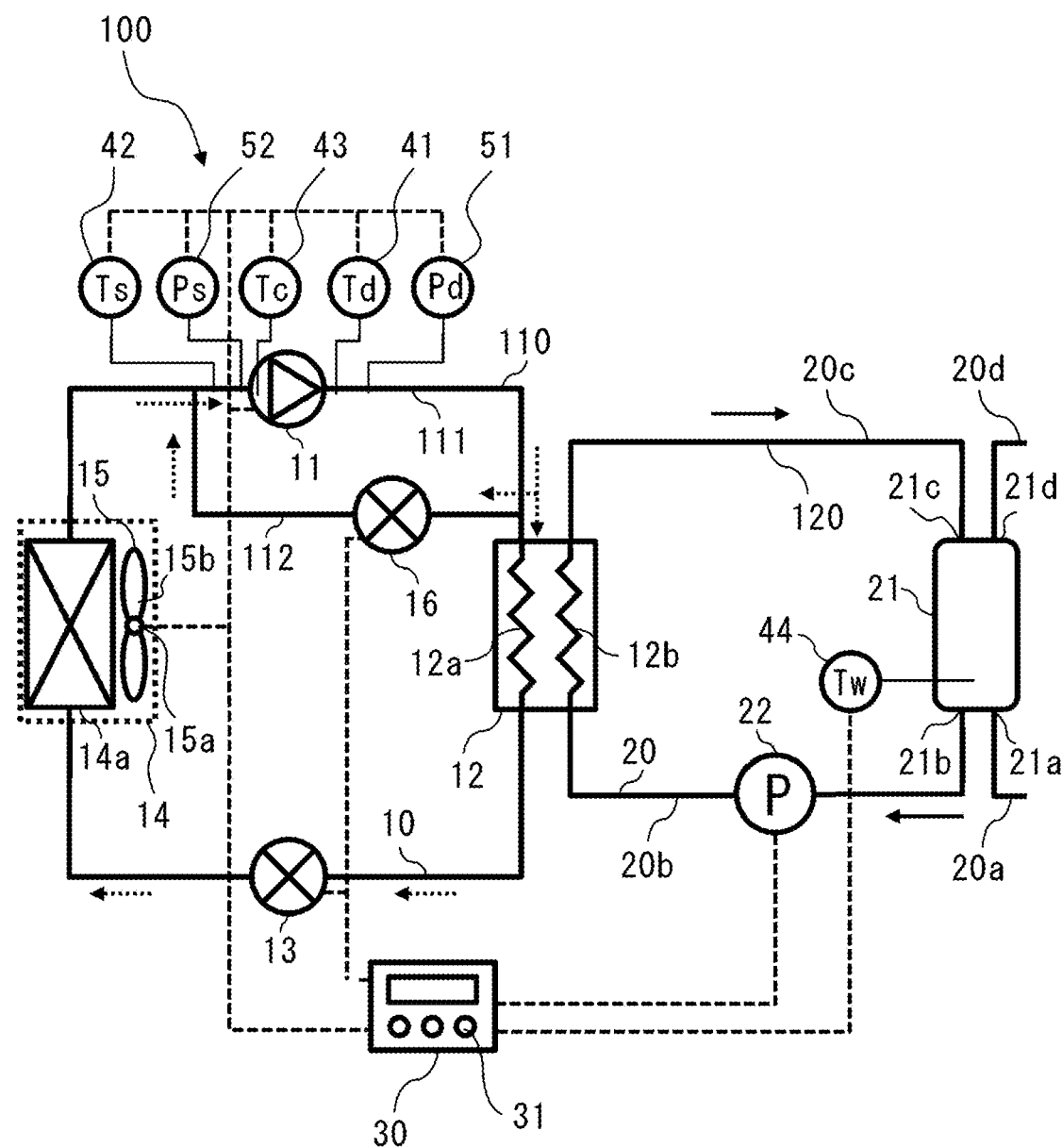
FIG. 1 is a schematic view illustrating a configuration example of a heat-pump water heater according to Embodiment 1.

FIG. 1 is a schematic view illustrating a configuration example of a heat-pump water heater 100 according to Embodiment 1. The heat-pump water heater 100 is a water heater using a heat pump. As illustrated in FIG. 1, the heat-pump water heater 100 includes a refrigerant circuit 110 in which components are connected by refrigerant pipes 10 and a water circuit 120 in which components are connected by water pipes 20. The heat-pump water heater 100 causes heat exchange to be performed between refrigerant that flows in the refrigerant circuit 110 and water that flows in the water circuit, thereby heating the water, and then causes the heated water to be stored in a hot water tank 21 provided in the water circuit 120.

Refrigerant Circuit 110

The refrigerant circuit 110 includes a compressor 11, a water heat exchanger 12, a first pressure-reducing device 13, an air heat exchanger 14, and a second pressure-reducing device 16. The compressor 11, the water heat exchanger 12, the first pressure-reducing device 13, the air heat exchanger 14, and the second pressure-reducing device 16 are connected by the refrigerant pipes 10. In the refrigerant pipe 10, the refrigerant flows. The refrigerant circuit 110 is a closed circuit, and in the refrigerant circuit 110, a flow passage is formed to allow the refrigerant to flow therethrough. The refrigerant flows in such a manner as to circulate in the refrigerant circuit 110. The refrigerant circuit 110 may be referred to as a heat pump circuit or a heat source device. The refrigerant circuit 110 which is the heat source device heats water that flows in the water circuit 120.

The refrigerant circuit 110 includes a main circuit 111 and a first bypass circuit 112. The main circuit 111 includes the compressor 11, the water heat exchanger 12, the first pressure-reducing device 13, and the air heat exchanger 14. The main circuit 111 is formed such that components in the main circuit are sequentially connected. In the main circuit 111, the compressor 11, the water heat exchanger 12, the first pressure-reducing device 13, and the air heat exchanger 14 are sequentially connected by refrigerant pipes 10.

The first bypass circuit 112 forms a flow passage that connects the refrigerant pipe 10 between the compressor 11 and the water heat exchanger 12 and the refrigerant pipe 10 between the air heat exchanger 14 and the compressor 11. That is, the first bypass circuit 112 forms a flow passage that guides part of refrigerant discharged from a discharge port of the compressor 11 to a suction port of the compressor 11 without causing the above part of the refrigerant to pass through the water heat exchanger 12, the first pressure-reducing device 13, and the air heat exchanger 14. The first bypass circuit 112 includes the second pressure-reducing device 16.

Since the heat-pump water heater 100 includes the first bypass circuit 112, high-temperature and high gas refrigerant discharged from the compressor 11 can be caused to pass through the first bypass circuit 112 to flow to a pipe on a suction refrigerant side of the compressor 11. Thus, the heat-pump water heater 100 can cause the high-temperature and high-pressure gas refrigerant to be mixed with refrigerant that is sucked into the compressor 11, thereby reducing the probability that liquid refrigerant will return to the compressor 11.

The compressor 11 sucks low-temperature and low-pressure refrigerant, compresses the sucked refrigerant to change it into high-temperature and high-pressure refrigerant, and discharges the high-temperature and high-pressure refrigerant. The compressor 11 is, for example, a compressor which is provided with an inverter and whose operating frequency is changed, whereby the compressor is controlled in capacity that is a delivery amount per unit time. Therefore, the capacity of the compressor 11 can be controlled, and in order to increase the rate of heating by the refrigerant circuit 110, the compressor 11 is operated such that the capacity of the compressor 11 is increased. That is, the compressor 11 is operated in such a manner as to increase the amount of circulation of the refrigerant. The operating frequency of the compressor 11 is controlled by a controller 30 which will be described later.

The water heat exchanger 12 causes heat exchange to be performed between refrigerant that flows in the refrigerant circuit 110 and water that flows in the water circuit 120, whereby the water is heated by heat of the refrigerant. The water heat exchanger 12 includes a first flow passage 12a which forms part of the refrigerant circuit 110 and allows the refrigerant to flow therethrough, and a second flow passage 12b which forms part of the water circuit 120 and allows the water to flow therethrough. That is, the water heat exchanger 12 causes heat exchange to be performed between the refrigerant that flows through the first flow passage 12a and the water which flows through the second flow passage 12b, whereby the water is heated by the heat of the refrigerant.

The first flow passage 12a and the second flow passage 12b may be, for example, heat transfer tubes. In this case, the first flow passage 12a is a refrigerant heat transfer tube, and the second flow passage 12b is a water heat transfer tube. In the water heat exchanger 12, for example, in the case where the first flow passage 12a and the second flow passage 12b are the heat transfer tubes as in a plate heat exchanger, the refrigerant and the water exchange heat with each other via the refrigerant heat transfer tube and the water heat transfer tube. The water heat exchanger 12 operates as a condenser which causes the heat of the refrigerant to be transferred to the water, thereby condensing the refrigerant.

The first pressure-reducing device 13 reduces the pressure of the refrigerant. The first pressure-reducing device 13 is a valve whose opening degree can be controlled, such as an electronic expansion valve. The opening degree of the first pressure-reducing device 13 is controlled by the controller 30. In the following description, the first pressure-reducing device 13 and the second pressure-reducing device 16 may each be generically as "pressure-reducing device."

The air heat exchanger 14 includes an air-sending device 15 and heat exchange circuitry 14a that causes heat exchange to be performed between air and the refrigerant, and causes heat exchange to be performed between outdoor air sent from the air-sending device 15 and the refrigerant that flows in the heat exchange circuitry 14a. The air heat exchanger 14 operates as an evaporator that evaporates the refrigerant in a hot-water supply operation, and cools the outdoor air with heat of evaporation at the time when the refrigerant is evaporated.

The air-sending device 15 sends outdoor air to be subjected to heat exchange with the refrigerant at the air heat exchanger 14 to the heat exchange circuitry 14a of the air heat exchanger 14. In the air-sending device 15, a fan 15b is rotated by a motor 15a, and air is made to flow by rotation of the fan 15b. The rotation speed of the motor 15a of the air-sending device 15 is controlled by the controller 30.

The second pressure-reducing device 16 reduces the pressure of the refrigerant. Furthermore, the second pressure-reducing device 16 adjusts the flow rate of refrigerant that flows in the first bypass circuit 112. The second pressure-reducing device 16 is a valve whose opening degree can be controlled, such as an electronic expansion valve. The opening degree of the second pressure-reducing device 16 can be controlled.

As the refrigerant that flows in refrigerant circuit 110, not only single-component refrigerant, but also mixed refrigerant or non-azeotropic refrigerant can be applied. The refrigerant that flows in the refrigerant circuit 110 can be applied as, for example, $CO_2$ refrigerant or mixed refrigerant of R1234yf and R32.

Water Circuit 120

The water circuit 120 as illustrated in FIG. 1 includes the hot water tank 21, a water pump 22, and the water heat exchanger 12. The hot water tank 21, the water pump 22, and the water heat exchanger 12 are sequentially connected by the water pipes 20. In each of the water pipes 20, water flows. The water circuit 120 forms a flow passage for water. The water circuit 120 is formed such that components in the water circuit 120 are sequentially connected. In the water circuit 120, water circulates.

The hot water tank 21 stores water or heated water that is supplied from the outside. The heated water is water heated by heat exchange with the refrigerant that flows in the refrigerant circuit 110. In lower part of the hot water tank 21, a water supply port 21a and the outflow port 21b are provided. With the water supply port 21a, an external water supply tube 20a is connected. The external water supply tube 20a causes a water supplier (not illustrated) and the hot water tank 21 to communicate with each other. The hot water tank 21 is supplied with water from the outside through the water supply port 21a, and stores the supplied water as non-heated water.

With the outflow port 21b, a water supply pipe 20b is connected. The water supply pipe 20b forms part of the water pipe 20, and causes the hot water tank 21 and an inlet of the second flow passage 12b provided in the water heat exchanger 12 to communicate with each other. Non-heated water stored in the lower part of the hot water tank 21 flows out therefrom through the outflow port 21b, passes through the water supply pipe 20b, and is supplied to the water heat exchanger 12.

In upper part of the hot water tank 21, an inflow port 21c is provided. With the inflow port 21c, a hot-water supply pipe 20c is connected. The hot-water supply pipe 20c forms part of the above water pipe 20, and causes an outlet of the second flow passage 12b provided in the water heat exchanger 12 and the hot water tank 21 to communicate with each other. The hot water tank 21 stores heated water that is supplied thereto through the inflow port 21c after being heated in the water heat exchanger 12.

Furthermore, in the upper part of the hot water tank 21, a hot-water supply port 21d is provided. With the hot-water supply port 21d, an external hot-water supply pipe 20d is connected. The external hot-water supply pipe 20d causes the hot water tank 21 and a place to be supplied with hot water to communicate with each other. The heated water stored in the upper part of the hot water tank 21 is supplied to the outside thereof through the hot-water supply port 21d, and is used as warm water that comes out from, for example, a shower.

The water pump 22 is driven by a motor not illustrated, and transfers water that flows out from the hot water tank 21 to the water heat exchanger 12. Furthermore, the water pump 22 transfers water that flows out from the water heat exchanger 12 to the hot water tank 21. The water pump 22 includes, for example, an inverter, and an operating frequency of the water pump 22 is changed, thereby controlling the rotation speed of the motor per unit time.

The water pump 22 is provided at the water supply pipe 20b. In the water circuit 120, the water pump 22 is provided between the outflow port 21b of the hot water tank 21 and the inlet of the second flow passage 12b provided in the water heat exchanger 12. The operation of the water pump 22 is controlled by the controller 30.

Various Measuring Devices

The heat-pump water heater 100 includes various measuring devices. The heat-pump water heater 100 includes a discharge temperature sensor 41 provided in the refrigerant circuit 110. The discharge temperature sensor 41 detects a pipe temperature of the refrigerant pipe 10 connected with a discharge port of the compressor 11. The pipe temperature of the refrigerant pipe 10 which is detected by the discharge temperature sensor 41 will be referred to as a discharge pipe temperature. The discharge pipe temperature is a pipe temperature on a refrigerant discharge side of the compressor 11 and is a temperature of part of the refrigerant pipe that is close to a discharge port of the compressor 11. The discharge temperature sensor 41 detects the discharge pipe temperature and supplies it to the controller 30, which will be described later The heat-pump water heater 100 includes a suction temperature sensor 42 provided in the refrigerant circuit 110. The suction temperature sensor 42 detects a pipe temperature of the refrigerant pipe 10 connected with a suction port of the compressor 11. The pipe temperature of the refrigerant pipe 10 which is detected by the suction temperature sensor 42 will be referred as a suction pipe temperature. The suction pipe temperature is a pipe temperature on a refrigerant suction side of the compressor 11 and is a pipe temperature of part of the refrigerant pipe that is close to a suction port of the compressor 11. The suction temperature sensor 42 detects the suction pipe temperature and supplies it to the controller 30.

The heat-pump water heater 100 includes a compressor temperature sensor 43 provided at the compressor 11. The compressor temperature sensor 43 detects a temperature of lower part of a shell container that forms an outer shell of the compressor 11. The compressor temperature sensor 43 detects the temperature of the lower part of the shell container of the compressor 11 and supplies it to the controller 30.

The heat-pump water heater 100 includes a high pressure sensor 51 provided in the refrigerant circuit 110. The high pressure sensor 51 detects the pressure of refrigerant discharged from the compressor 11. The high pressure sensor 51 detects the pressure of the refrigerant by measuring, for example, a pipe pressure of the refrigerant pipe 10 connected with the discharge port of the compressor 11. The high pressure sensor 51 detects the pressure of the refrigerant discharged from the compressor 11, which is a pressure on a high pressure side thereof, and supplies it to the controller 30.

The heat-pump water heater 100 includes a low pressure sensor 52 provided in the refrigerant circuit 110. The low pressure sensor 52 detects the pressure of refrigerant that is sucked by the compressor 11. The low pressure sensor 52 is provided between the refrigerant suction side of the compressor 11 and the air heat exchanger 14. The low pressure sensor 52 detects the pressure of the refrigerant by measuring, for example, a pipe pressure of the refrigerant pipe 10 connected with the suction port of the compressor 11. The low pressure sensor 52 detects the pressure of refrigerant that is sucked by the compressor 11, which is a pressure of a low pressure side thereof, and supplies it to the controller 30.

The heat-pump water heater 100 includes a water temperature sensor 44 provided in the water circuit 120. The water temperature sensor 44 detects the temperature of water stored in the hot water tank 21. The water temperature sensor 44 detects the temperature of the water stored in the hot water tank 21 and supplies it to the controller 30 as described below.

Controller 30

Furthermore, the heat-pump water heater 100 includes the controller 30. The controller 30 controls components provided in the refrigerant circuit 110 and the water circuit 120. The controller 30 controls the operation of the entire heat-pump water heater 100 based on various information received from components in the heat-pump water heater 100 in order that hot water be stored in the hot water tank 21. For example, the controller 30 controls, for example, the operating frequency of the compressor 11, the operating frequency of the air-sending device 15, the operating frequency of the water pump 22, the opening degree of the first pressure-reducing device 13, and the opening degree of the second pressure-reducing device 16, based on various information from various sensors provided in the heat-pump water heater 100.

The controller 30 runs software on an arithmetic device such as a microcomputer, thereby fulfilling various functions, or is hardware such as a circuit device that fulfills the various functions.

Figure 2:
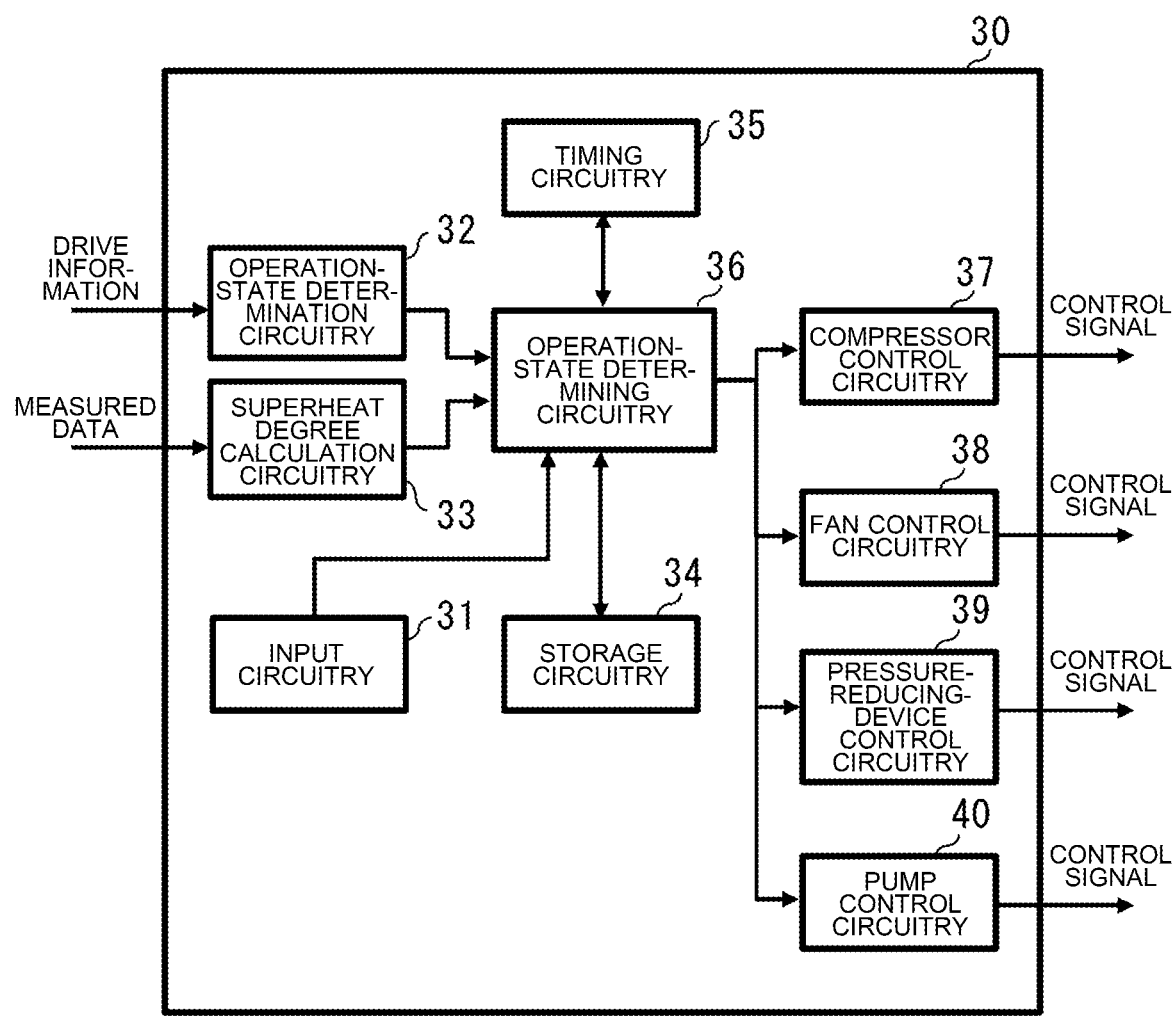
FIG. 2 is a block diagram illustrating a configuration example of a controller as illustrated in FIG. 1.

FIG. 2 is a block diagram illustrating a configuration example of the controller as illustrated in FIG. 1. As illustrated in FIG. 2, the controller 30 includes operation-state determination circuitry 32 and superheat degree calculation circuitry 33. Furthermore, the controller 30 includes input circuitry 31, storage circuitry 34, timing circuitry 35, and operation-state determining circuitry 36. In addition, the controller 30 includes compressor control circuitry 37, fan control circuitry 38, pressure-reducing device control circuitry 39, and pump control circuitry 40.

To the operation-state determination circuitry 32, drive information on the heat-pump water heater 100 is input. The drive information is, for example, a frequency to drive the compressor 11, a frequency to drive the motor 15a of the air-sending device 15, opening degrees of the first pressure-reducing device 13 and the second pressure-reducing device 16, a frequency to drive a motor (not illustrated) of the water pump 22, etc. The operation-state determination circuitry 32 receives drive information on driven state of components from the components. The operation-state determination circuitry 32 transmits drive information on, for example, the compressor 11 based on the input drive information to the operation-state determining circuitry 36. It should be noted that it is not indispensable that the operation-state determination circuitry 32 is provided. For example, as the above drive information, drive information on components that is currently set in the operation-state determining circuitry 36 may be used.

Furthermore, to the operation-state determination circuitry 32, drive information, such as the temperature of water stored in the hot water tank 21 that is detected by the water temperature sensor 44, is input. The operation-state determination circuitry 32 transfers the input information on the temperature of the water in the hot water tank 21 to the operation-state determining circuitry 36.

The superheat degree calculation circuitry 33 calculates the degree of superheat of the refrigerant at each of locations on the basis of measured data of the discharge temperature sensor 41, the suction temperature sensor 42, the compressor temperature sensor 43, the high pressure sensor 51, and the low pressure sensor 52.

More specifically, to the superheat degree calculation circuitry 33, information on the pressure of refrigerant discharged from the compressor 11 that is detected by the high pressure sensor 51 is input. The superheat degree calculation circuitry 33 calculates a saturated gas temperature of the refrigerant from the pressure of the refrigerant that is detected by the high pressure sensor 51. The saturated gas temperature of the refrigerant is calculated from the pressure of the refrigerant that is detected by the high pressure sensor 51, using a conversion table for saturated gas temperatures of the refrigerant that correspond to respective pressures of various kinds of refrigerant that are input to the controller 30. The conversion table for the saturated gas temperatures of the refrigerant is stored in, for example, the storage circuitry 34. In addition, to the superheat degree calculation circuitry 33, information on the discharge pipe temperature detected by the discharge temperature sensor 41 is input. The superheat degree calculation circuitry 33 calculates the degree of superheat of the refrigerant at a discharge pipe from the difference between the discharge pipe temperature of the compressor 11 and the saturated gas temperature of the refrigerant which is calculated from the pressure detected by the high pressure sensor 51. The superheat degree calculation circuitry 33 transmits information on the calculated degree of superheat of the refrigerant at the discharge pipe to the operation-state determining circuitry 36. It should be noted that the degree of superheat of the refrigerant at the discharge pipe will be referred as a discharge superheat degree.

Moreover, to the superheat degree calculation circuitry 33, information on the pressure of refrigerant sucked by the compressor 11 that is detected by the low pressure sensor 52 is input. The superheat degree calculation circuitry 33 calculates a saturated gas temperature of the refrigerant from the pressure of the refrigerant which is detected by the low pressure sensor 52. The saturated gas temperature of the refrigerant is calculated from the pressure of the refrigerant which is detected by the low pressure sensor 52, using the conversion table for the saturated gas temperatures of the refrigerant that correspond to respective pressures of various kinds of refrigerant that are input to the controller 30. In addition, to the superheat degree calculation circuitry 33, information on the suction pipe temperature detected by the suction temperature sensor 42 is input. The superheat degree calculation circuitry 33 calculates the degree of superheat of the refrigerant at a suction pipe from the difference between the suction pipe temperature of the compressor 11 and the saturated gas temperature of the refrigerant which is calculated from the pressure detected by the low pressure sensor 52. The superheat degree calculation circuitry 33 transmits information on the calculated degree of superheat of the refrigerant at the suction pipe to the operation-state determining circuitry 36. It should be noted that the degree of superheat of the refrigerant at the suction pipe will be referred to as a suction superheat degree.

Furthermore, to the superheat degree calculation circuitry 33, information on the temperature of the lower part of the shell container of the compressor 11 which is detected by the compressor temperature sensor 43 is input. The superheat degree calculation circuitry 33 calculates the degree of superheat of the refrigerant at the compressor 11 from the difference between the temperature of the lower part of the shell container of the compressor 11 and the saturated gas temperature of the refrigerant which is calculated from the pressure detected by the low pressure sensor 52. The superheat degree calculation circuitry 33 transmits information on the degree of superheat of the refrigerant at the compressor 11 to the operation-state determining circuitry 36. The degree of superheat of the refrigerant at the compressor 11 will be referred to as a compressor-shell lower-part superheat degree.

The input circuitry 31 is an input device for use in setting of a night-time hot-water supply mode. The input circuitry 31 is, for example, a contact, a switch, or a remote control. By doing input to the input circuitry 31, it is possible to make the setting of whether to turn on or off the night-time hot-water supply mode, set a target water temperature of water that is stored in the hot water tank 21, set a start time of the night-time hot-water supply mode, set an ending time of the night-time hot-water supply mode, and make other settings.

The storage circuitry 34 stores in advance, for example, data and a program necessary for a control by the controller 30. For example, the storage circuitry 34 stores in advance a first threshold for the discharge superheat degree that is used by the operation-state determining circuitry 36, a second threshold for the suction superheat degree that is used by the operation-state determining circuitry 36, and a third threshold for the compressor-shell lower-part superheat degree.

Furthermore, the storage circuitry 34 stores in advance information on the opening degrees of the first pressure-reducing device 13 and the second pressure-reducing device 16 in a normal hot-water supply mode which will be described later and the night-time hot-water supply mode. In addition, the storage circuitry 34 stores in advance the frequency of the compressor 11, the rotation speed of the motor 15a of the air-sending device 15, the rotation speed of the motor of the water pump 22 and other information in each of the normal hot-water supply mode and the night-time hot-water supply mode. The storage circuitry 34 may store various setting information input to the input circuitry 31.

The timing circuitry 35 is, for example, a timer or a real-time clock, and indicates current time, or measures time.

The operation-state determining circuitry 36 gives an instruction to each of the compressor control circuitry 37, the fan control circuitry 38, the pressure-reducing device control circuitry 39, and the pump control circuitry 40 on the basis of input information from each of the operation-state determination circuitry 32, the superheat degree calculation circuitry 33, the input circuitry 31, the storage circuitry 34, the timing circuitry 35, and other components. The operation-state determining circuitry 36 sets each of the normal hot-water supply mode and the night-time hot-water supply mode on the basis of input information from each of the operation-state determination circuitry 32, the superheat degree calculation circuitry 33, the input circuitry 31, the storage circuitry 34, the timing circuitry 35, and other components.

When the operation state of the heat-pump water heater 100 is the night-time hot-water supply mode, the compressor control circuitry 37 outputs a control signal for lowering the frequency of the compressor 11 to the lowest frequency to the compressor 11, based on the result of determination by the operation-state determining circuitry 36. The lowest frequency is stored advance in the storage circuitry 34 as a lowest frequency necessary for causing the compressor 11 to be continuously operated without causing a fail to occur.

When the operation state of the heat-pump water heater 100 is the night-time hot-water supply mode, the fan control circuitry 38 outputs a control signal for stopping the air-sending device 15 to the air-sending device 15.

When the operation state of the heat-pump water heater 100 is the night-time hot-water supply mode, the pressure-reducing device control circuitry 39 sets the opening degree of each of the first pressure-reducing device 13 and the second pressure-reducing device 16 to an opening degree determined in advance. When the operating state of the heat-pump water heater 100 is the night-time hot-water supply mode, the pressure-reducing device control circuitry 39 outputs a control signal for decreasing the opening degree of the first pressure-reducing device 13 to the first pressure-reducing device 13, based on the result of determination by the operation-state determining circuitry 36, thereby ensuring an appropriate degree of superheat of the refrigerant. The opening degree of the first pressure-reducing device 13 is set in advance and stored in the storage circuitry 34.

Furthermore, when the operation state of the heat-pump water heater 100 is the night-time hot-water supply mode, the pressure-reducing device control circuitry 39 outputs a control signal for increasing the opening degree of the second pressure-reducing device 16 to the second pressure-reducing device 16, based on the result of determination by the operation-state determining circuitry 36. The opening degree of the second pressure-reducing device 16 is set in advance and stored in the storage circuitry 34.

When the operation state of the heat-pump water heater 100 is the night-time hot-water supply mode, the pump control circuitry 40 outputs a control signal for lowering the operating frequency of the water pump 22 to the lowest frequency to the water pump 22. The lowest frequency is set in advance as a lowest frequency necessary for causing the water pump 22 to be operated, and is stored in the storage circuitry 34.

Operation of Heat-Pump Water Heater 100

An operation of the heat-pump water heater 100 having the above configuration will be described. In the following, the flow of the refrigerant and that of water in the normal hot-water supply mode and an operation in the night-time hot-water supply mode will be described.

Flow of Refrigerant and Flow of Water

First of all, the flow of the refrigerant and that of water in the normal hot-water supply mode will be described. Refrigerant that flows in the refrigerant circuit 110 is compressed by the compressor 11 and is then discharged from the compressor 11. The refrigerant discharged from the compressor 11 flows into the first flow passage 12a in the water heat exchanger 12. The refrigerant that has flowed into the first flow passage 12a in the water heat exchanger 12 exchanges heat with water that flows through the second flow passage 12b in the water circuit 120, thus condenses while transferring heat to the water to heat the water, and then flows out from the water heat exchanger 12.

The refrigerant that has flowed out from the water heat exchanger 12 is reduced in pressure and expanded by the first pressure-reducing device 13, and then flows out from the first pressure-reducing device 13. The refrigerant that has flowed out from the first pressure-reducing device 13 flows into the air heat exchanger 14. The refrigerant that has flowed into the air heat exchanger 14 exchanges heat with outdoor air, receives heat therefrom to evaporate, and flows out from the air heat exchanger 14. The refrigerant that has flowed out from the air heat exchanger 14 is sucked into the compressor 11. Then, the cycle of the above changes of the refrigerant is repeated.

In the water circuit 120, by the operation of the water pump 22, non-heated water is made to flow out from the outflow port 21b provided in the lower part of the hot water tank 21. The non-heated water that has flowed out from the hot water tank 21 flows into the second flow passage 12b in the water heat exchanger 12. The non-heated water that has flowed into the second flow passage 12b in the water heat exchanger 12 exchanges heat with refrigerant that flows in the first flow passage 12a in the refrigerant circuit 110, is thus heated by the refrigerant, and then flows out from the water heat exchanger 12. The heated water that has flowed out from the water heat exchanger 12 flows into the hot water tank 21 from the inflow port 21c provided in the upper part of the hot water tank 21, and is stored in the hot water tank 21. Then, the cycle of the above changes of the non-heated water in the hot water tank 21 is repeated.

Night-Time Hot-Water Supply Mode

Figure 3:
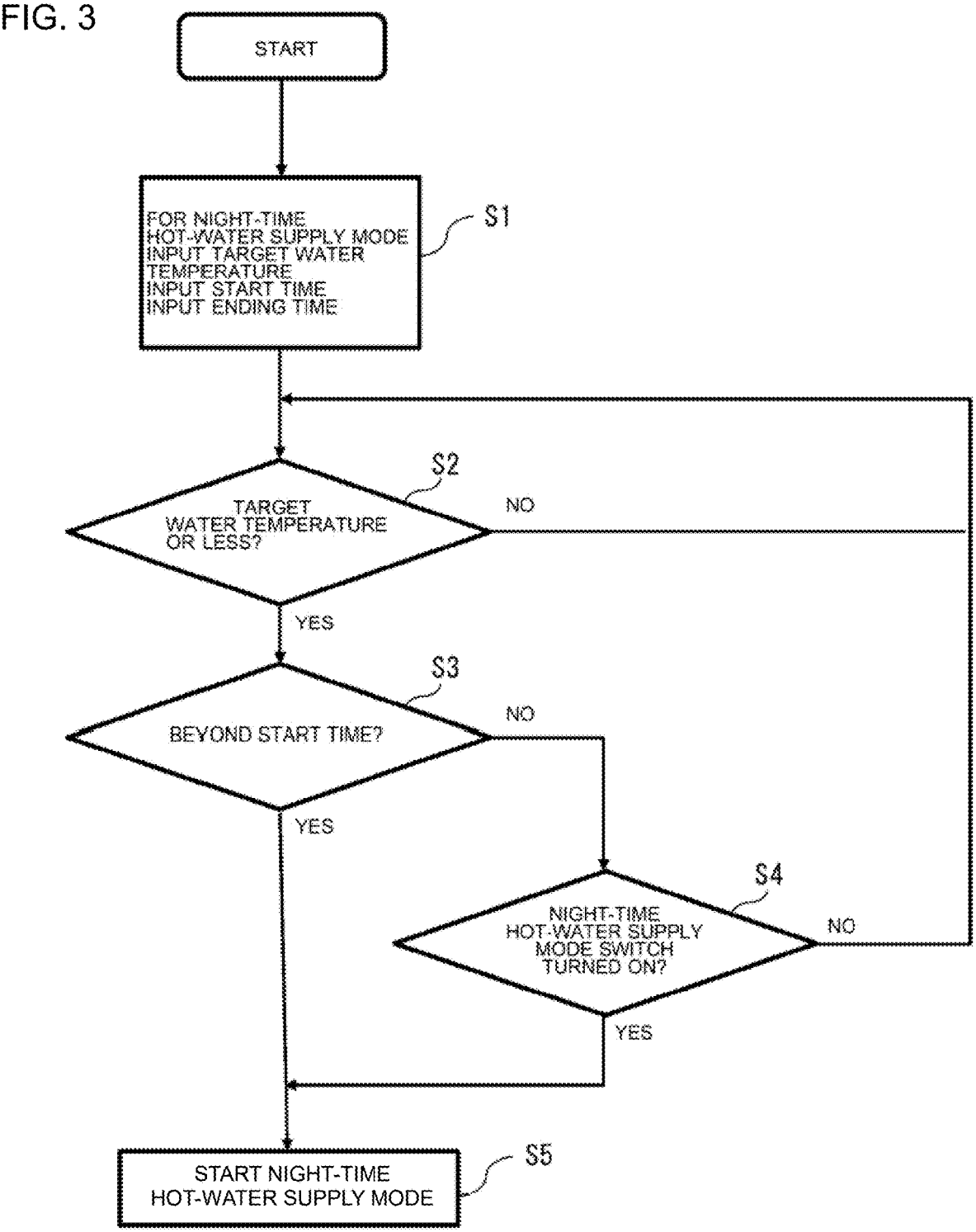
FIG. 3 is a flow chart of a flow to the start of a night-time hot-water supply mode in the heat-pump water heater according to Embodiment 1.
Figure 4:
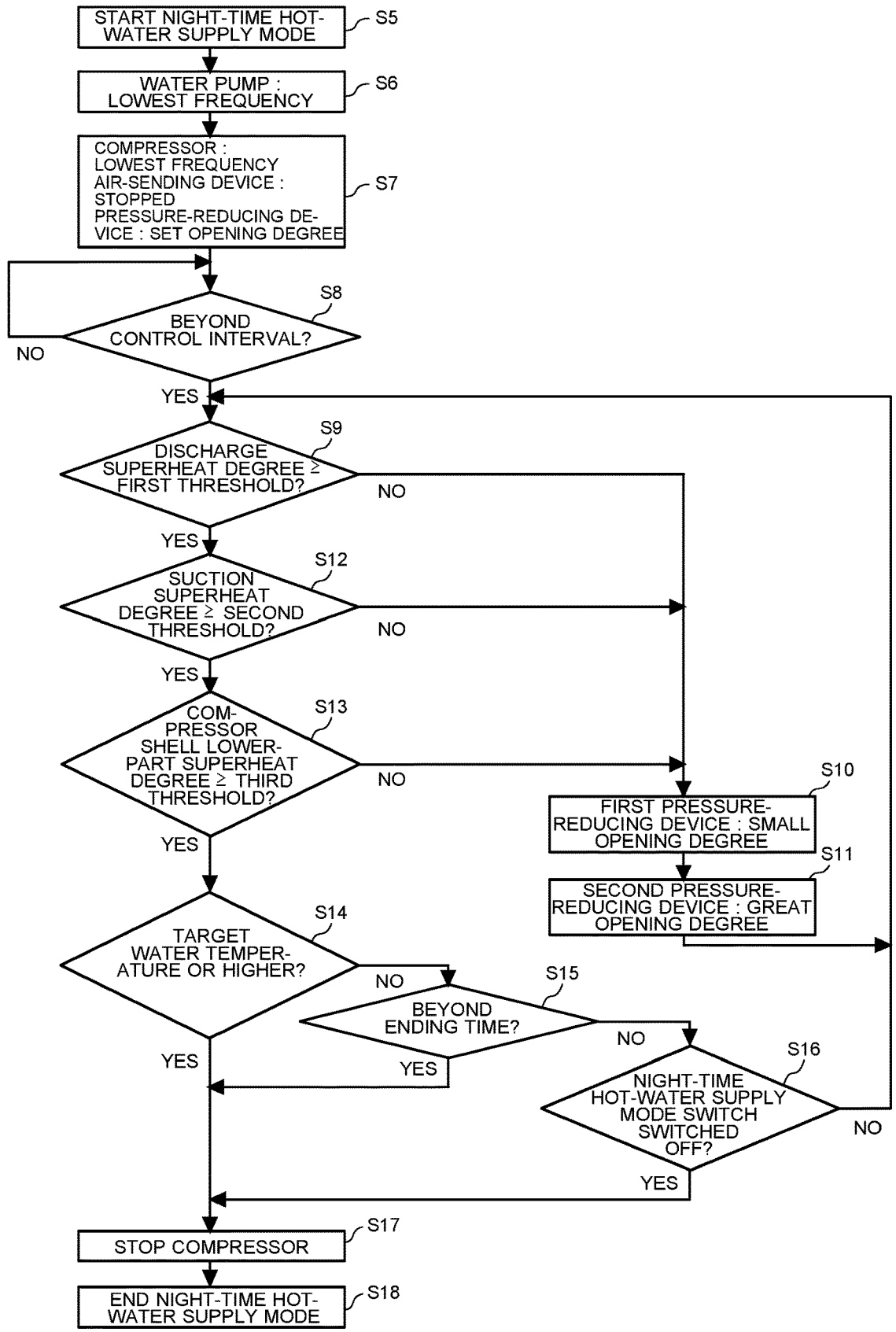
FIG. 4 is a flow chart of a control in the night-time hot-water supply mode in the heat-pump water heater according to Embodiment 1.

FIG. 3 is a flow chart of the flow to the start of the night-time hot-water supply mode in the heat-pump water heater 100 according to Embodiment 1. FIG. 4 is a flow chart of a control in the night-time hot-water supply mode in the heat-pump water heater 100 according to Embodiment 1. In the night-time hot-water supply mode, an operation of the heat-pump water heater 100 during night-time is performed. In the night-time hot-water supply mode, during night-time, water in the water heat exchanger 12 is heated by heat exchange between the water and the refrigerant, and the heated water is stored in the hot water tank 21. With reference to FIGS. 3 and 4, the operation of the heat-pump water heater 100 in the night-time hot-water supply mode will be described.

As indicated in FIG. 3, a user inputs various information for use in the night-time hot-water supply mode, using the input circuitry 31 provided in the controller 30 (step S1). For example, the user inputs using the input circuitry 31, a target water temperature of heated water that is stored in the hot water tank 21 (step S1); the user inputs using the input circuitry 31, a start time of the night-time hot-water supply mode (step S1); and the user inputs using the input circuitry 31, an ending time of the night-time hot-water supply mode (step S1).

Next, to the operation-state determination circuitry 32, water temperature information on the temperature of water stored in the hot water tank 21 that is detected by the water temperature sensor 44 is input. The operation-state determination circuitry 32 transmits the input water temperature on the temperature of the water in the hot water tank 21 to the operation-state determining circuitry 36. The operation-state determining circuitry 36 of the controller 30 compares the current temperature of the water in the hot water tank 21 that is currently detected by the water temperature sensor 44 with the target water temperature input by the input circuitry 31 in the step S1 (step S2). Then, the operation-state determining circuitry 36 determines whether the water temperature detected by the water temperature sensor 44 is lower than or equal to the target water temperature or not (step S2).

It should be noted that in the heat-pump water heater 100, at the time at which step S2 is carried out, the compressor 11 and the air-sending device 15 are in the stopped state; and should also be noted that the water pump 22 is operated with the lowest frequency because the water pump 22 needs to continuously circulate water from the standpoint of detection of water temperature.

When determining in step S2 that the water temperature detected by the water temperature sensor 44 is higher than the target water temperature (No in step S2), the operation-state determining circuitry 36 re-compares the water temperature detected by the water temperature sensor 44 with the target water temperature.

When determining in step S2 that the water temperature detected by the water temperature sensor 44 is lower than or equal to the target water temperature (Yes in step S2), the operation-state determining circuitry 36 determines whether the current time exceeds the start time of the night-time hot-water supply mode or not (step S3). That is, the operation-state determining circuitry 36 compares current time that is currently input from the timing circuitry 35 with the start time of the night-time hot-water supply mode that is input using the input circuitry 31 in step S1 (step S3). Then, the operation-state determining circuitry 36 determines whether the current time exceeds the start time of the night-time hot-water supply mode or not.

When determining in step S3 that the current time does not exceed the start time of the night-time hot-water supply mode (No in step S3), the operation-state determining circuitry 36 determines whether the user turns on a night-time hot-water supply mode switch or not (step S4).

The operation-state determining circuitry 36 determines in step S4 that the user does not turn on the night-time hot-water supply mode switch (No in step S4), the processing returns to step S2. Then, the operation-state determining circuitry 36 re-compares the water temperature detected by the water temperature sensor 44 with the target water temperature (step S2).

When determining in step S3 that the current time exceeds the start time of the night-time hot-water supply mode (Yes in step S3), the operation-state determining circuitry 36 starts the night-time hot-water supply mode (step S5). Furthermore, when determining in step S4 that the user turns on the night-time hot-water supply mode switch (Yes in step S4), the operation-state determining circuitry 36 starts the night-time hot-water supply mode (step S5).

As illustrated in FIG. 4, when the night-time hot-water supply mode starts (step S5), the operation-state determining circuitry 36 gives an instruction to the pump control circuitry 40 based on information on the operating frequency of the water pump 22 that is stored in advance in the storage circuitry 34. When the night-time hot-water supply mode starts (step S5), the pump control circuitry 40 outputs to the water pump 22, a control signal for causing the operating frequency of the water pump 22 to reach the lowest frequency set in advance (step S6).

As indicated in FIG. 4, when the operating frequency of the water pump 22 is set to the lowest frequency (step S6), the operation-state determining circuitry 36 gives an instruction to the compressor control circuitry 37 based on information on the operating frequency of the compressor 11 that is stored in advance in the storage circuitry 34. When the operating frequency of the water pump 22 is set to the lowest frequency (step S6), the compressor control circuitry 37 outputs a control signal for causing the operating frequency of the compressor 11 to reach the lowest frequency set in advance to the compressor 11 (step S7).

When the operating frequency of the water pump 22 is set to the lowest frequency (step S6), the operation-state determining circuitry 36 gives an instruction to the fan control circuitry 38. When the operating frequency of the water pump 22 is set to the lowest frequency (step S6), the fan control circuitry 38 keeps the air-sending device 15 in the stopped state (step S7).

Furthermore, when the operating frequency of the water pump 22 is set to the lowest frequency (step S6), the operation-state determining circuitry 36 gives an instruction to the pressure-reducing device control circuitry 39 based on information on the opening degree of the first pressure-reducing device 13 that is stored in advance in the storage circuitry 34. When the operating frequency of the water pump 22 is set to the lowest frequency (step S6), the operation-state determining circuitry 36 gives an instruction to the pressure-reducing device control circuitry 39 based on information on the opening degree of the second pressure-reducing device 16 that is stored in advance in the storage circuitry 34.

When the operating frequency of the water pump 22 is set to the lowest frequency (step S6), the pressure-reducing device control circuitry 39 outputs control signals for causing the opening degrees of the first pressure-reducing device 13 and the second pressure-reducing device 16 to reach opening degrees set in advance to the first pressure-reducing device 13 and the second pressure-reducing device 16 (step S7). It should be noted that the opening degree set in advance regarding the first pressure-reducing device 13 is a predetermined opening degree to which the opening degree of the first pressure-reducing device 13 is set in order that an appropriate suction superheat degree could be ensured.

In step S7, when the compressor 11 is operated with the lowest frequency set in advance, the air-sending device 15 is kept in the stopped state, and the opening degrees of the first pressure-reducing device 13 and the second pressure-reducing device 16 are set to opening degrees set in advance, the processing by the controller 30 proceeds to step S8 after time set in advance elapses. The time set in advance is stored in the storage circuitry 34.

The operation-state determining circuitry 36 determines whether a control interval elapses or not (step S8). The control interval is an interval for a control of operating the first pressure-reducing device 13 and the second pressure-reducing device 16. The control interval is time for determining timing to determine whether or not to operate each of the first pressure-reducing device 13 and the second pressure-reducing device 16. By carrying out step S8, the controller 30 performs a control of causing the processing to proceed to step S9 at intervals set in advance. The control interval is stored in advance in the storage circuitry 34. The control interval is set to, for example, 10 to 60 seconds.

In step S8, the operation-state determining circuitry 36 determines whether the control interval elapses or not in order to prevent overshooting or hunching of a control amount in a control of the first pressure-reducing device 13 and the second pressure-reducing device 16. In the case where the requirements in steps S9, S12, and S13 which will be described later are not satisfied (No in each of these steps), and the pressure-reducing devices are continuously operated, the pressure-reducing devices are operated until the requirements in steps S9 to S13 are satisfied (Yes in these steps). In this case, there is a risk that overshooting and hunching in the control of the pressure-reducing devices will occur. It is possible to prevent overshooting or hunching in the control of the pressure-reducing device, since the operation-state determining circuitry 36 determines in step S8 whether the control interval elapses or not.

The operation-state determining circuitry 36 uses time measured by the timing circuitry 35 and the time interval stored in advance in the storage circuitry 34. The operation-state determining circuitry 36 determines whether the control interval elapses or not (step S8). When the operation-state determining circuitry 36 determines that the control interval does not elapse (No in step S8), the processing returns to step S8, and the operation-state determining circuitry 36 determines whether the control interval elapses or not (step S8). When the operation-state determining circuitry 36 determines that the control interval elapses (Yes in step S8), the processing proceeds to step S9.

The superheat degree calculation circuitry 33 of the controller 30 transmits information on the calculated discharge superheat degree to the operation-state determining circuitry 36. The operation-state determining circuitry 36 compares a current discharge superheat degree that is calculated by the superheat degree calculation circuitry 33 with the first threshold stored in advance in the storage circuitry 34 (step S9). Then, the operation-state determining circuitry 36 determines whether the discharge superheat degree is higher than or equal to the first threshold or not.

When determining that the current discharge superheat degree is less than the first threshold set in advance (No in step S9), the operation-state determining circuitry 36 gives an instruction to the pressure-reducing device control circuitry 39 based on information on the opening degree of the first pressure-reducing device 13 that is stored in advance in the storage circuitry 34. The pressure-reducing device control circuitry 39 outputs to the first pressure-reducing device 13, a control signal for adjusting the first pressure-reducing device 13 to set the opening degree thereof to the opening degree set in advance (step S10). In this case, the opening degree set in advance regarding the first pressure-reducing device 13 is set smaller than the current opening degree of the first pressure-reducing device 13. The refrigerant circuit 110 causes the opening degree of the first pressure-reducing device 13 to be decreased, thereby ensuring an appropriate superheat degree.

Change the Opening Degree to

In step S10, after causing the opening degree of the first pressure-reducing device 13 to be decreased, the operation-state determining circuitry 36 gives an instruction to the pressure-reducing device control circuitry 39 based on information on the opening degree of the second pressure-reducing device 16 that is stored in advance in the storage circuitry 34. The pressure-reducing device control circuitry 39 outputs to the second pressure-reducing device 16, an instruction signal for adjusting the second pressure-reducing device 16 to set the opening degree thereof to the opening degree set in advance (step S11). In this case, the opening degree set in advance regarding the second pressure-reducing device 16 is set greater than current the opening degree of the second pressure-reducing device 16.

When determining that the discharge superheat degree is less than the first threshold, the operation-state determining circuitry 36 determines that liquid-refrigerant back to the compressor 11 occurs. Thus, the operation-state determining circuitry 36 causes the opening degree of the second pressure-reducing device 16 to be increased, thereby increasing the flow rate of refrigerant that flows in the first bypass circuit 112 and thus increasing the flow rate of refrigerant that is made to flow from the discharge pipe of the compressor 11 to the suction pipe through the bypass circuit.

After the controller 30 sets in step S11 the opening degree of the second pressure-reducing device 16, the processing returns to step S9. The operation-state determining circuitry 36 re-compares the current discharge superheat degree with the first threshold set in advance (step S9).

When it is determined that the current discharge superheat degree is greater than or equal to the first threshold (yes in step S9), the processing by the controller 30 proceeds to step S12.

The superheat degree calculation circuitry 33 of the controller 30 transmits information on a calculated suction superheat degree to the operation-state determining circuitry 36. The operation-state determining circuitry 36 compares the current suction superheat degree that is calculated by the superheat degree calculation circuitry 33 with the second threshold that is stored in advance in the storage circuitry 34 (step S12). Then, the operation-state determining circuitry 36 determines whether the suction superheat degree is greater than or equal to the second threshold or not.

When it is determined that the current suction superheat degree is less than the second threshold (No in step S12), the operation-state determining circuitry 36 gives an instruction to the pressure-reducing device control circuitry 39 based on information on the opening degree of the first pressure-reducing device 13 that is stored in advance in the storage circuitry 34. The pressure-reducing device control circuitry 39 outputs to the first pressure-reducing device 13, a control signal for adjusting the first pressure-reducing device 13 to set the opening degree thereof to the opening degree set in advance (step S10). In this case, the opening degree set in advance regarding the first pressure-reducing device 13 is smaller than the current opening degree thereof. The refrigerant circuit 110 causes the opening degree of the first pressure-reducing device 13 to be decreased, thereby ensuring an appropriate superheat degree.

In step S10, after causing the opening degree of the first pressure-reducing device 13 to be decreased, the operation-state determining circuitry 36 gives to the pressure-reducing device control circuitry 39, an instruction based on information on the opening degree of the second pressure-reducing device 16 that is stored in advance in the storage circuitry 34. The pressure-reducing device control circuitry 39 gives the second pressure-reducing device 16 an instruction for adjusting the opening degree of the second pressure-reducing device 16 to set the opening degree thereof to the opening degree set in advance (step S11). In this case, the opening degree set in advance regarding the second pressure-reducing device 16 is set greater than the current opening degree thereof.

When determining that the suction superheat degree is less than the second threshold, the operation-state determining circuitry 36 determines that liquid-refrigerant back to the compressor 11 occurs. Thus, the operation-state determining circuitry 36 causes the opening degree of the second pressure-reducing device 16 to be increased, thereby increasing the flow rate of refrigerant that flows in the first bypass circuit 112 and thus increasing the flow rate of refrigerant that is made to flow from the discharge pipe of the compressor 11 to the suction pipe through the bypass circuit.

After the controller 30 sets in step S11 the opening degree of the second pressure-reducing device 16, the processing returns to step S9. The operation-state determining circuitry 36 re-compares the current discharge superheat degree with the first threshold stored in advance (step S9).

When it is determined that the current suction superheat degree is greater than or equal to the second threshold (Yes in step S12), the processing by the controller 30 proceeds to step S13.

The superheat degree calculation circuitry 33 of the controller 30 transmits information on a calculated compressor-shell lower-part superheat degree to the operation-state determining circuitry 36. The operation-state determining circuitry 36 compares the current compressor-shell lower-part superheat degree that is calculated by the superheat degree calculation circuitry 33 with the third threshold that is stored in advance in the storage circuitry 34 (step S13). Then, the operation-state determining circuitry 36 determines whether the compressor-shell lower-part superheat degree is greater than or equal to the third threshold or not.

When it is determined that the current compressor-shell lower-part superheat degree is less than the third threshold set in advance (No in step S13), the operation-state determining circuitry 36 gives an instruction to the pressure-reducing device control circuitry 39 based on information on the opening degree of the first pressure-reducing device 13 that is stored in advance in the storage circuitry 34. The pressure-reducing device control circuitry 39 outputs to the first pressure-reducing device 13, a control signal for adjusting the first pressure-reducing device 13 to set the opening degree thereof to the opening degree set in advance (step S10). In this case, the opening degree set in advance regarding the first pressure-reducing device 13 is set smaller than the current opening degree thereof. The refrigerant circuit 110 causes the opening degree of the first pressure-reducing device 13 to be decreased, thereby ensuring an appropriate superheat degree.

Then, in step S10, after causing the opening degree of the first pressure-reducing device 13 to be decreased, the operation-state determining circuitry 36 gives an instruction to the pressure-reducing device control circuitry 39 based on information on the opening degree of the second pressure-reducing device 16 that is stored in advance in the storage circuitry 34. The pressure-reducing device control circuitry 39 outputs to the second pressure-reducing device 16, a control signal for adjusting the second pressure-reducing device 16 to set the opening degree thereof to the opening degree set in advance (step S11). In this case, the opening degree set in advance regarding the second pressure-reducing device 16 is set greater than the current opening degree thereof.

When determining that the compressor-shell lower-part superheat degree is less than the third threshold, the operation-state determining circuitry 36 determines that liquid-refrigerant back to the compressor 11 occurs. Thus, the operation-state determining circuitry 36 causes the opening degree of the second pressure-reducing device 16 to be increased, thereby increasing the flow rate of refrigerant that flows in the first bypass circuit 112 and thus increasing the flow rate of refrigerant that is made to flow from the discharge pipe of the compressor 11 to the suction pipe through the bypass circuit.

After the controller 30 sets in step S11 the opening degree of the second pressure-reducing device 16, the processing by the controller 30 returns to step S9. The operation-state determining circuitry 36 re-compares the current discharge superheat degree with the first threshold set in advance (step S9).

When it is determined in step S13 that the current suction superheat degree is greater than or equal to the third threshold set in advance (Yes in step S13), the processing by the controller 30 proceeds to step S14.

The operation-state determining circuitry 36 compares the current temperature of water in the hot water tank 21 that is detected by the water temperature sensor 44 with a target water temperature input using the input circuitry 31 in step S1 (step S14). Then, the operation-state determining circuitry 36 determines whether the water temperature detected by the water temperature sensor 44 is higher than or equal to the target water temperature or not (step S14). It should be noted that to the operation-state determination circuitry 32, water temperature information on the temperature of the water stored in the hot water tank 21 that is detected by the water temperature sensor 44 is input. The operation-state determination circuitry 32 transmits the above input water temperature information to the operation-state determining circuitry 36.

When determining in step S2 that the water temperature detected by the water temperature sensor 44 is lower than the target water temperature (No in step S14), the operation-state determining circuitry 36 determines whether the current time exceeds the ending time of the night-time hot-water supply mode or not (step S15). The operation-state determining circuitry 36 compares the current time input from the timing circuitry 35 with the ending time of the night-time hot-water supply mode that is input using the input circuitry 31 in step S1 (step S15).

When determining in step S15 that the current time does not exceed the ending time of the night-time hot-water supply mode (No in step S15), the operation-state determining circuitry 36 determines whether the user turns off the night-time hot-water supply mode switch or not (step S16).

When the operation-state determining circuitry 36 determines that the user does not turn off the night-time hot-water supply mode switch (No in step S16), the processing by the operation-state determining circuitry 36 returns to step S9. The operation-state determining circuitry 36 re-compares the current discharge superheat degree with the first threshold set in advance (step S9).

When determining in step S14 that the water temperature detected by the water temperature sensor 44 is higher than or equal to the target water temperature (Yes in step S14), the operation-state determining circuitry 36 stops the compressor 11 (step S17) and ends the night-time hot-water supply mode (step S18).

Furthermore, when determining in step S15 that the current time exceeds the ending time of the night-time hot-water supply mode (Yes in step S15), the operation-state determining circuitry 36 stops the compressor 11 (step S17) and ends the night-time hot-water supply mode (step S18).

In addition, when determining that the user turns off the night-time hot-water supply mode switch (Yes in step S16), the operation-state determining circuitry 36 stops the compressor 11 (step S17) and ends the night-time hot-water supply mode (step S18).

Advantages of Heat-Pump Water Heater 100

In the night-time hot-water supply mode, the controller 30 causes the water pump 22 to operate with the lowest frequency set in advance, causes the compressor 11 to operate with the lowest frequency set in advance, and stops the air-sending device 15 which is configured to promote heat exchange between air and the refrigerant that is performed at the air heat exchanger 14, whereby the air-sending device 15 is not rotated. In general, noise made by rotation of an air-sending device provided adjacent to an air heat exchanger constitutes most of the noise made from the refrigerant circuit 110. In the heat-pump water heater 100, in the night-time hot-water supply mode, the controller 30 causes the air-sending device 15 to be in the stopped state, and can reduce noise made by the operation of the heat-pump water heater 100 during night-time.

Furthermore, in general, a heat-pump water heater causes an air-sending device to operate even in an operation of the heat-pump water heater during night-time. In contrast, in the heat-pump water heater 100, in the night-time hot-water supply mode, the controller 30 causes the air-sending device 15 to be in the stopped state, and can reduce energy consumption that would be increased by the operation of the air-sending device 15 during night-time. The heat-pump water heater 100 can further improve an energy saving efficiency than an existing heat-pump water heater that causes an air-sending device 15 to operate during night-time.

In addition, in general, in the operation of the heat-pump water heater, after the target water temperature is reached, the operation of the compressor 11 is stopped. Then, when the water temperature is re-lowered, the compressor 11 is started. Thus, in some cases, during night-time, in the heat-pump water heater, a heating operation of a refrigerant circuit and a hot-water storing operation of a water circuit are repeatedly performed and stopped. In contrast, the controller 30 causes, in the night-time hot-water supply mode, causes the water pump 22 to operate with the lowest frequency set in advance, and the compressor 11 to operate with the lowest frequency set in advance. In the night-time hot-water supply mode, in the heat-pump water heater 100, the compressor 11 is caused to operate with the lowest frequency, thereby achieving a high efficient operation, and the entire amount of water in the hot water tank 21 is slowly boiled up over time, thereby achieving a high efficient operation. Thus, in the heat-pump water heater 100, it is possible to reduce the probability that the heating operation of the refrigerant circuit 110 and the hot-water storing operation of the water circuit 120 will be repeatedly performed and stopped.

Furthermore, in the night-time hot-water supply mode, the controller 30 causes the water pump 22 to operate with the lowest frequency set in advance, and causes the compressor 11 to operate with the lowest frequency set in advance. Thus, in the heat-pump water heater 100, it is possible to reduce noise made from the heat-pump water heater 100, as compared with the case where the water pump 22 and the compressor 11 are each operated with a frequency higher than the lowest frequency. Also, in the night-time hot-water supply mode, since the controller 30 causes the water pump 22 to operate with the lowest frequency set in advance, and a pump input is reduced, it is possible to improve the energy saving efficiency, as compared with the case where the water pump is operated with a frequency higher than the lowest frequency. Therefore, in the heat-pump water heater 100, it is possible to achieve a higher efficiency of the entire system.

Also, in the night-time hot-water supply mode, when the discharge superheat degree is less than the first threshold set in advance, the controller 30 controls the opening agree of the first pressure-reducing device 13 to set the opening degree thereof to an opening degree set in advance, such that the opening degree of the first pressure-reducing device 13 is reduced from the current opening degree of the first pressure-reducing device 13. Furthermore, when the suction superheat degree is less than the second threshold set in advance, the controller 30 controls the opening degree of the first pressure-reducing device 13 to set the opening degree thereof to an opening degree set in advance, such that the opening degree of the first pressure-reducing device 13 is reduced from the current opening degree of the first pressure-reducing device 13. In addition, when the compressor-shell lower-part superheat degree is less than the third threshold set in advance, the controller 30 controls the opening degree of the first pressure-reducing device 13 to set the opening degree thereof to an opening set in advance, such that the opening degree of the first pressure-reducing device 13 is reduced from the current opening degree of the first pressure-reducing device 13. In the heat-pump water heater 100, by reducing the opening degree of the first pressure-reducing device 13 to an opening degree that is smaller than the current opening degree of the first pressure-reducing device 13, it is possible to ensure an appropriate superheat degrees, such as an appropriate discharge superheat degree, an appropriate suction superheat degree, and an appropriate compressor-shell lower-part superheat degree.

In addition, in general, in the case where an air-sending device is stopped, if the function of an air heat exchanger that operates as an evaporator is lowered, and two-phase gas-liquid refrigerant does not completely evaporate, and in this state, flows into the compressor, liquid back to a compressor may occur. In the night-time hot-water supply mode, when the discharge superheat degree is less than the first threshold set in advance, the controller 30 of the heat-pump water heater 100 controls the opening degree of the second pressure-reducing device 16 to set the opening degree thereof to the opening degree set in advance, such that the opening degree of the second pressure-reducing device 16 is increased from the current opening degree of the second pressure-reducing device 16. When the suction superheat degree is less than the second threshold set in advance, the controller 30 controls the opening degree of the second pressure-reducing device 16 to set the opening degree thereof to the opening degree set in advance, such that the opening degree of the second pressure-reducing device 16 is increased from the current opening degree thereof. When the compressor-shell lower-part superheat degree is less than the third threshold set in advance, the controller 30 controls the opening degree of the second pressure-reducing device 16 to cause the opening degree thereof to reach the opening degree set in advance, such that the opening degree of the second pressure-reducing device 16 is increased from the current opening degree thereof. In the heat-pump water heater 100, by increasing the opening degree of the second pressure-reducing device 16 in the refrigerant circuit 110 such that the opening degree of the second pressure-reducing device 16 is greater than the current opening degree of the second pressure-reducing device 16, it is possible to cause the gas refrigerant discharged from the compressor 11 to flow to the suction pipe, using the bypass circuit, and reduce occurrence of liquid-refrigerant back to the compressor 11.

Embodiment 2

Figure 5:
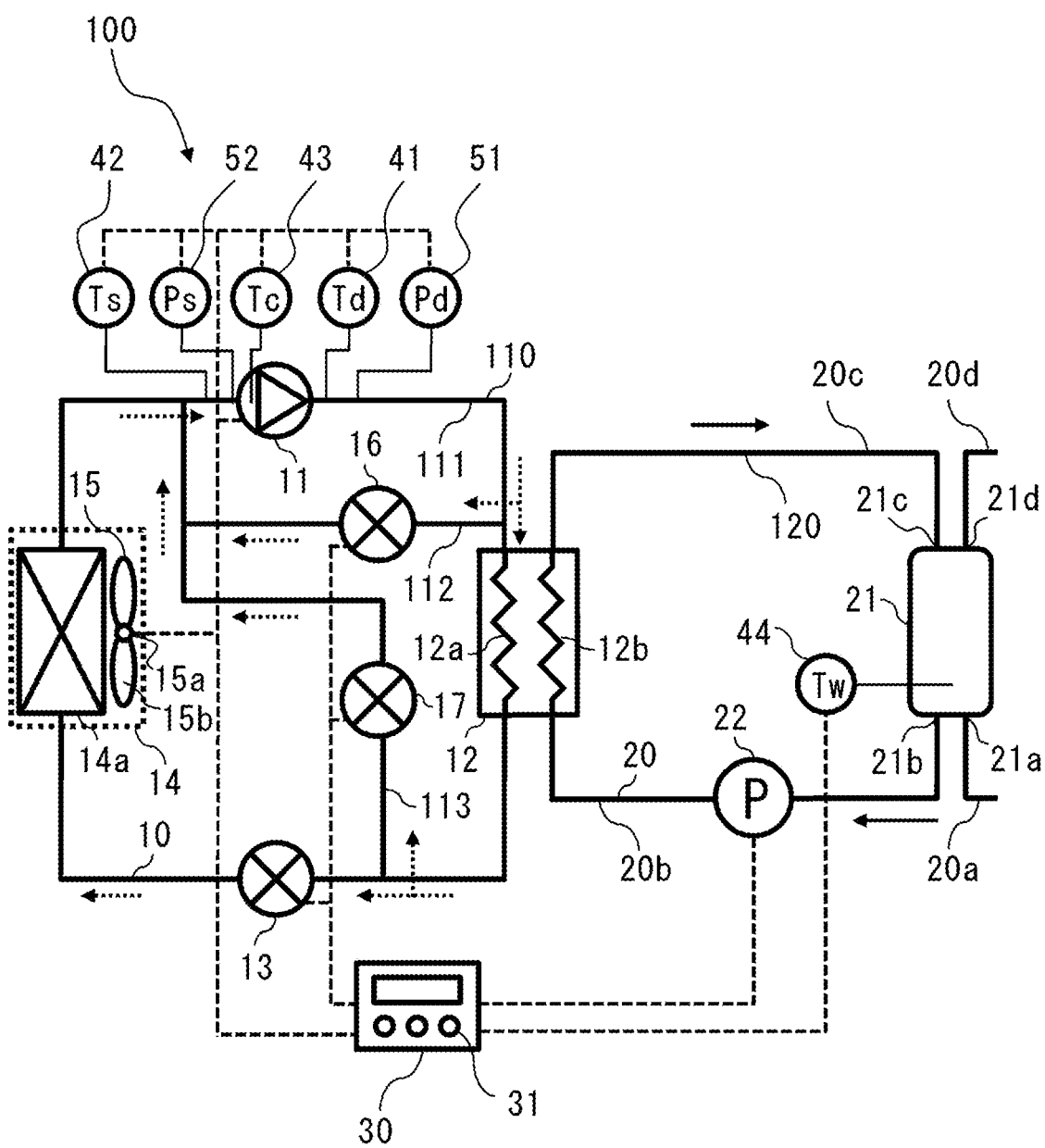
FIG. 5 is a schematic view illustrating a configuration example of a heat-pump water heater according to Embodiment 2.

FIG. 5 is a schematic view illustrating a configuration example of a heat-pump water heater 100 according to Embodiment 2. In the heat-pump water heater 100 according to Embodiment 2, components that have the same functions and the same operations as those in the heat-pump water heater 100 according to Embodiment 1 will be denoted by the same reference signs, and their descriptions will thus be omitted. The description concerning Embodiment 2 will be made by referring mainly to the differences between Embodiments 1 and 2, and will not refer to configurations in Embodiment 2 that are the same as those in Embodiment 1.

The refrigerant circuit 110 includes the main circuit 111, the first bypass circuit 112, and a second bypass circuit 113. The second bypass circuit 113 forms a flow passage that connects the refrigerant pipe 10 between the water heat exchanger 12 and the first pressure-reducing device 13 and the refrigerant pipe 10 between the air heat exchanger 14 and the compressor 11. That is, the second bypass circuit 113 forms a flow passage that guides part of refrigerant that flows out from the water heat exchanger 12 to a suction port of the compressor 11 without causing the part of the refrigerant to pass through the first pressure-reducing device 13 or the air heat exchanger 14. The second bypass circuit 113 includes a third pressure-reducing device 17.

The third pressure-reducing device 17 reduces the pressure of the refrigerant. Furthermore, the third pressure-reducing device 17 adjusts the flow rate of refrigerant that flows in the second bypass circuit 113. The third pressure-reducing device 17 is a valve whose opening degree can be controlled, such as an electronic expansion valve. The opening degree of the third pressure-reducing device 17 is controlled by the controller 30.

Figure 6:
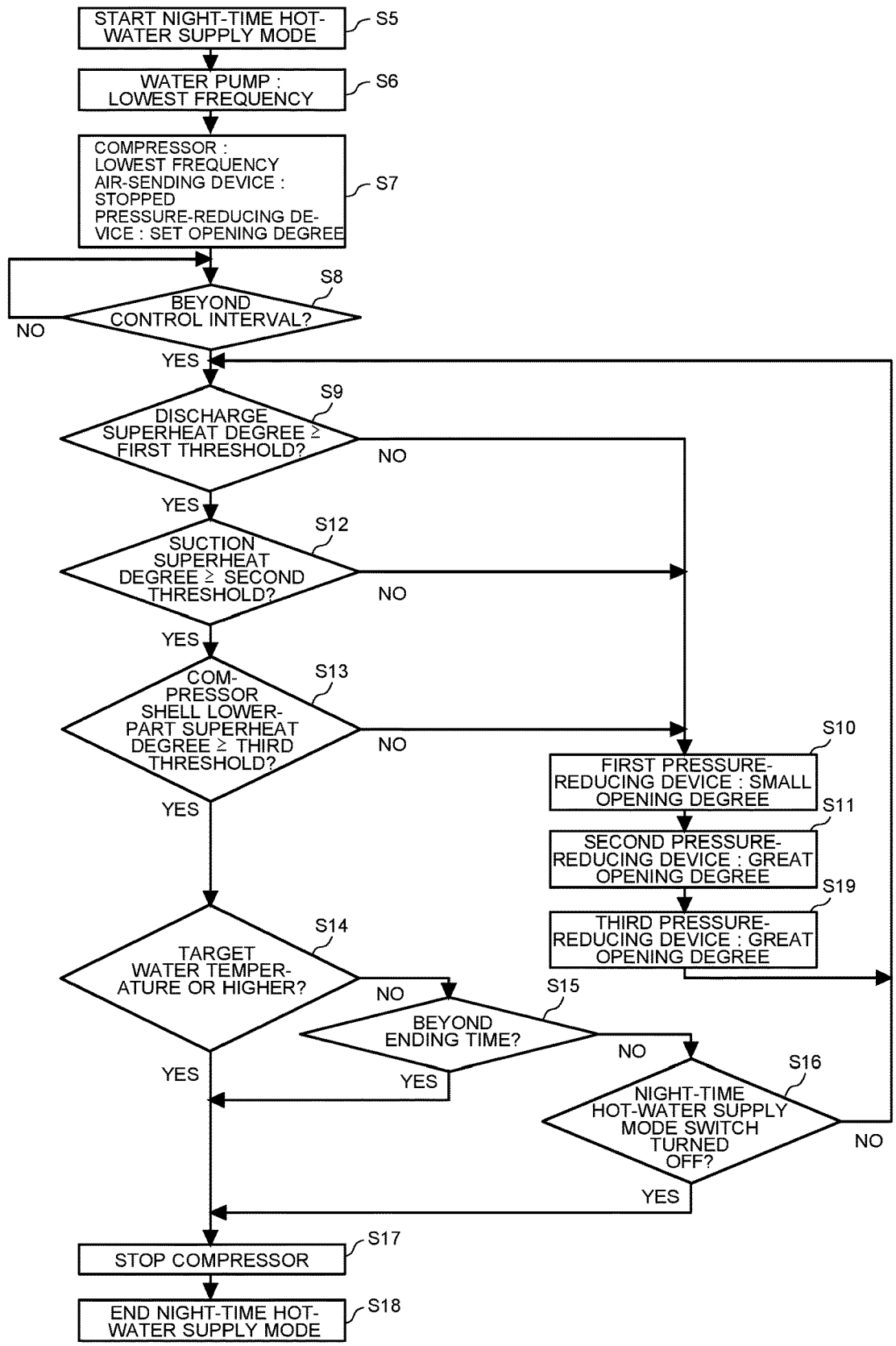
FIG. 6 is a flow chart in a control in a night-time hot-water supply mode in the heat-pump water heater 100 according to Embodiment 2.

FIG. 6 is a flow chart in a control in the night-time hot-water supply mode in the heat-pump water heater 100 according to Embodiment 2. With reference to FIG. 6, only the difference between a night-time mode of the heat-pump water heater 100 according to Embodiment 2 and a night-time mode of the heat-pump water heater 100 according to Embodiment 1 will be described. In step S11, the controller 30 of the heat-pump water heater 100 according to Embodiment 2 sets the opening degree of the second pressure-reducing device 16, and the processing by the controller 30 proceeds to step S19.

Then, in step S11, the operation-state determining circuitry 36 increases the opening degree of the second pressure-reducing device 16, and then gives an instruction to the pressure-reducing device control circuitry 39 based on information on the opening degree of the third pressure-reducing device 17 that is stored in advance in the storage circuitry 34. The pressure-reducing device control circuitry 39 outputs to the third pressure-reducing device 17, a control signal for adjusting the third pressure-reducing device 17 to set the opening degree thereof to an opening set in advance (step S19). In this case, the opening degree set in advance regarding the third pressure-reducing device 17 is set greater than the current opening degree thereof.

When determining that the discharge superheat degree is less than the first threshold, the operation-state determining circuitry 36 determines that liquid-refrigerant back to the compressor 11 occurs. Furthermore, when determining that the suction superheat degree is less than the second threshold, the operation-state determining circuitry 36 determines that liquid-refrigerant back to the compressor 11 occurs. In addition, when determining that the compressor-shell lower-part superheat degree is less than the third threshold, the operation-state determining circuitry 36 determines that liquid-refrigerant back to the compressor 11 occurs. Thus, in the operation-state determining circuitry 36, by increasing the opening degree of the third pressure-reducing device 17, the operation-state determining circuitry 36 increases the flow rate of refrigerant that flows in the second bypass circuit 113, and thus increases the flow rate of refrigerant that is caused to flow from the suction pipe of the compressor 11 to the suction pipe using the bypass circuit.

In step S19, after the controller 30 sets the opening degree of the third pressure-reducing device 17, the processing by the controller 30 proceeds to step S9. The operation-state determining circuitry 36 re-compares the current discharge superheat degree with the first threshold set in advance (step S9).

It should be noted that in Embodiment 2, the control interval is an interval for a control to operate the first pressure-reducing device 13, the second pressure-reducing device 16, and the third pressure-reducing device 17. The control interval is time for determining timing to make a determination whether or not to cause each of the first pressure-reducing device 13, the second pressure-reducing device 16, and the third pressure-reducing device 17 to operate. In step S8, the operation-state determining circuitry 36 determines whether the control interval elapses or not in order to prevent overshooting or hunching of a control amount in a control of the first pressure-reducing device 13, the second pressure-reducing device 16, and the third pressure-reducing device 17.

Advantages of Heat-Pump Water Heater 100

The refrigerant circuit 110 further includes the second bypass circuit 113 which forms the flow passage connecting the refrigerant pipe 10 between the water heat exchanger 12 and the first pressure-reducing device 13 and the refrigerant pipe 10 between the air heat exchanger 14 and the compressor 11. By virtue of the second bypass circuit 113, the heat-pump water heater 100 can cause liquid refrigerant, gas refrigerant, or two-phase gas-liquid refrigerant that flows out from the water heat exchanger 12 to flow through the second bypass circuit 113 to the pipe on the refrigerant suction side of the compressor 11, using the bypass flow passage. Therefore, in the heat-pump water heater 100, high-temperature and high-pressure gas refrigerant that has passed through the first bypass circuit 112 and refrigerant that has passed through the second bypass circuit 113 are mixed with refrigerant that is sucked into the compressor 11, thereby reducing occurrence of liquid-refrigerant back to the compressor 11.

When the discharge superheat degree is less than the first threshold value set in advance, the controller 30 performs a control for adjusting the third pressure-reducing device 17 to set the opening degree thereof to the opening degree set in advance, such that the opening degree of the third pressure-reducing device 17 is increased from the current opening degree thereof. When the suction superheat degree is less than the second threshold set in advance, the controller 30 performs a control for setting the opening degree of the third pressure-reducing device 17 to the opening degree set in advance, such that the opening degree of the third pressure-reducing device 17 is increased from the current opening degree thereof. When the compressor-shell lower-part superheat degree is less than the third threshold set in advance, the controller 30 performs a control for setting the opening degree of the third pressure-reducing device 17 to the opening degree set in advance, such that the opening degree of the third pressure-reducing device 17 is increased from the current opening degree thereof. By increasing the opening degree of the third pressure-reducing device 17 such that the opening degree thereof is greater than the current opening degree thereof, in the heat-pump water heater 100, the high-temperature and high-pressure gas refrigerant that has passed through the first bypass circuit 112 and the refrigerant that has passed through the second bypass circuit 113 are mixed with the refrigerant that is sucked into the compressor 11. In the heat-pump water heater 100, the high-temperature and high-pressure gas refrigerant that has passed through the first bypass circuit 112 and the refrigerant that has passed through the second bypass circuit 113 are mixed with the refrigerant that is sucked into the compressor 11, thereby reducing occurrence of liquid-refrigerant back to the compressor 11.

Furthermore, the heat-pump water heater 100 includes two bypass circuits, that is, the first bypass circuit 112 and the second bypass circuit 113. Thus, in the heat-pump water heater 100, the temperature and state of the refrigerant can be further greatly adjusted than in the case where only the first bypass circuit 112 is provided.

The configurations described above regarding Embodiments 1 and 2 are merely examples of the contents of the present disclosure, can be combined with well-known techniques, and part of the configurations can be omitted and modified without departing from the gist of the current disclosure. For example the compressor temperature sensor 43 which detects the temperature of the lower part of the shell container of the compressor 11 does not need to be used if it is unnecessary for the configuration described regarding the embodiment. In order to accurately detect occurrence of liquid back to the compressor 11, it is preferable that the temperature of the lower part of the shell container of the compressor 11 or the compressor-shell lower-part superheat degree be calculated. However, it is not indispensable that the controller 30 uses the compressor temperature sensor 43, because it is possible to determine whether liquid back to the compressor 11 occurs or not, based on the discharge superheat degree and the suction superheat degree. In the case where the compressor temperature sensor 43 is not employed, the production cost and material cost of the refrigerant circuit 110 can be reduced.

Regarding Embodiments 1 and 2, the heat-pump water heater 100 is described above. The above configurations described regarding the heat-pump water heater 100 can be applied to other devices including a refrigerant circuit, such as a chilling unit or a circulating dehumidifier. Also, in a device including a refrigerant circuit 110 not including the hot water tank 21 or other components, if the target water temperature is set, the above configurations can be applied to, for example, an operation that is performed to prevent freezing of water at a pipe through which water flows.

The invention claimed is:

1. A heat-pump water heater comprising:
   a refrigerant circuit in which refrigerant circulates through refrigerant pipes;
   a water circuit in which water circulates through water pipes; and
   a controller configured to control components provided in the refrigerant circuit and components provided in the water circuit,
   wherein the refrigerant circuit includes a main circuit and a bypass circuit,
   wherein the main circuit is formed such that components in the main circuit are sequentially connected, and includes
      a compressor configured to compress the refrigerant sucked in to the compressor, and discharge the refrigerant which is compressed,
      a water heat exchanger configured to cause heat exchange to be performed between the refrigerant which flows in the refrigerant circuit and the water which flows in the water circuit,
      a first pressure-reducing device configured to reduce a pressure of the refrigerant, and
      an air heat exchanger including heat exchange circuitry and a fan, the heat exchange circuitry being configured to cause heat exchange to be performed between air and the refrigerant, the fan being configured to send to the heat exchange circuitry, the air which is subjected to the heat exchange with the refrigerant, wherein the refrigerant pipes include a first refrigerant pipe between the compressor and the water heat exchanger and a second refrigerant pipe between the air heat exchanger and the compressor, wherein the bypass circuit forms a flow passage that connects the first refrigerant pipe between the compressor and the water heat exchanger and the second refrigerant pipe between the air heat exchanger and the compressor, the bypass circuit including a second pressure-reducing device configured to adjust a flow rate of the refrigerant which flows in the bypass circuit, wherein the water circuit includes
- a hot water tank configured to store water supplied from the outside and heated water,
- a water pump configured to supply water that flows out from the hot water tank to the water heat exchanger and supply water that flows out from the water heat exchanger to the hot water tank, and
- the water heat exchanger, wherein the controller is configured to perform controls in a night-time hot-water supply mode different from controls in a normal hot-water supply mode, in the night-time hot-water supply mode which is during night-time, the water is heated by the heat exchange between the water and the refrigerant in the water heat exchanger, and the water which is heated is stored in the hot water tank, one of the controls in the night-time hot-water supply mode being performed to cause the water pump to operate with a lowest frequency set in advance, an other one of the controls in the night-time hot-water supply mode being performed to cause the compressor to operate with a lowest frequency set in advance, the other one of the controls being performed to stop the fan.

2. The heat-pump water heater of claim 1, further comprising:
- a discharge temperature sensor configured to detect a pipe temperature of the first refrigerant pipe which is connected with a discharge port of the compressor;
- a suction temperature sensor configured to detect a pipe temperature of the second refrigerant pipe which is connected with a suction port of the compressor;
- a compressor temperature sensor configured to detect a temperature of lower part of a shell container that forms an outer shell of the compressor;
- a water temperature sensor configured to detect a temperature of the water stored in the hot water tank;
- a high pressure sensor configured to detect a pressure of the refrigerant discharged from the compressor; and
- a low pressure sensor configured to detect a pressure of the refrigerant which is sucked into the compressor, wherein the controller is configured to, in the night-time hot-water supply mode, calculate a discharge superheat degree from a difference between a discharge pipe temperature of the compressor that is detected by the discharge temperature sensor and a saturated gas temperature of the refrigerant that is calculated from the pressure detected by the high pressure sensor, calculate a suction superheat degree from a difference between a suction pipe temperature of the compressor that is detected by the suction temperature sensor and a saturated gas temperature of the refrigerant that is calculated from the pressure detected by the low pressure sensor, calculate a compressor-shell lower-part superheat degree from a difference between the temperature of the lower part of the shell container that is detected by the compressor temperature sensor and a saturated gas temperature of the refrigerant that is calculated from the pressure detected by the low pressure sensor, control, when the discharge superheat degree is less than a first threshold set in advance, an opening degree of the first pressure-reducing device and an opening degree of the second pressure-reducing device, to set the opening degree of the first pressure-reducing device to an opening degree set in advance, such that the opening degree of the first pressure-reducing device is decreased from a current opening degree thereof, and to set the opening degree of the second pressure-reducing device to an opening degree set in advance, such that the opening degree of the second pressure-reducing device is increased from a current opening degree thereof, control, when the suction superheat degree is less than a second threshold set in advance, the opening degree of the first pressure-reducing device and the opening degree of the second pressure-reducing device, to set the opening degree of the first pressure-reducing device to an opening degree set in advance, such that the opening degree of the first pressure-reducing device is decreased from the current opening degree thereof, and to set the opening degree of the second pressure-reducing device to an opening degree set in advance, such that the opening degree of the second pressure-reducing device is increased from the current opening degree thereof, and control, when the compressor-shell lower-part superheat degree is less than a third threshold set in advance, the opening degree of the first pressure-reducing device and the opening degree of the second pressure-reducing device, to set the opening degree of the first pressure-reducing device to an opening degree set in advance, such that the opening degree of the first pressure-reducing device is decreased from the current opening degree thereof, and to set the opening degree of the second pressure-reducing device to an opening degree set in advance, such that the opening degree of the second pressure-reducing device is increased from the current opening degree thereof.

3. The heat-pump water heater of claim 2, wherein
the refrigerant pipes include a third refrigerant pipe between the water heat exchanger and the first pressure-reducing device, the refrigerant circuit further includes a second bypass circuit that forms a flow passage connecting the third refrigerant pipe between the water heat exchanger and the first pressure-reducing device and the second refrigerant pipe between the air heat exchanger and the compressor, wherein the second bypass circuit includes a third pressure-reducing device configured to adjust a flow rate of the refrigerant that flows in the second bypass circuit.

4. The heat-pump water heater of claim 3, wherein the controller is configured to:
control, when the discharge superheat degree is less than the first threshold set in advance, an opening degree of the third pressure-reducing device to set the opening degree of the third pressure-reducing device to an opening degree set in advance, such that the opening degree of the third pressure-reducing device is increased from a current opening degree of the third pressure-reducing device;

control, when the suction superheat degree is less than the second threshold set in advance, the opening degree of the third pressure-reducing device to set the opening degree of the third pressure-reducing device to an opening degree set in advance, such that the opening degree of the third pressure-reducing device is increased from the current opening degree of the third pressure-reducing device; and control, when the compressor-shell lower-part superheat degree is less than the third threshold set in advance, the opening degree of the third pressure-reducing device to set the opening degree of the third pressure-reducing device to an opening degree set in advance, such that the opening degree of the third pressure-reducing device is increased from the current opening degree of the third pressure-reducing device.

5. The heat-pump water heater of claim 1,
wherein the controller a start time of night-time hot-water supply mode and an ending time of the night-time hot-water supply mode, are both set in advance.

6. The heat-pump water heater of claim 1,
wherein, in the night-time hot-water supply mode, the controls a water temperature of water stored in the hot water tank to a target night-time water temperature set in advance, which is capable of being different from a target normal water temperature.

7. The heat-pump water heater of claim 1,
wherein, for the normal hot-water supply mode, a frequency of the compressor, a rotation speed of the fan, and a rotation speed of a motor of the water pump are all set in advance.

\* \* \* \* \*